Figure 1:
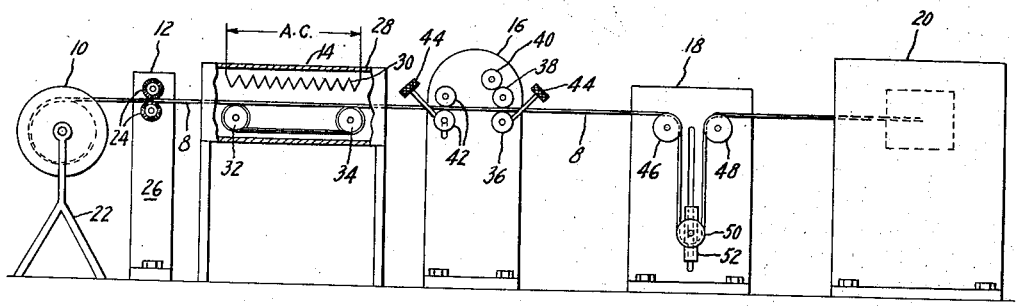

Jan. 12, 1960     L. S. FASOLI ET AL     2,920,384
PROCESS FOR APPLYING NUMERALS TO NEOPRENE WIRE
Filed Feb. 24, 1956

Inventors:
Leland S. Fasoli,
Arthur F. Ringwood,
by Vernon H. Kalb
Their Attorney.

United States Patent Office 2,920,384
Patented Jan. 12, 1960

2,920,384

PROCESS FOR APPLYING NUMERALS TO NEOPRENE WIRE

Leland S. Fasoli, Albany, and Arthur F. Ringwood, Maryland, N.Y., assignors to General Electric Company, a corporation of New York Application February 24, 1956, Serial No. 567,698

3 Claims. (Cl. 29—407)

The present invention relates to a process for manufacturing leads for electrical apparatus and more particularly to a process for cleaning, marking, measuring and cutting a cable into predetermined lengths prior to stripping and attaching a stamped terminal on an end thereof. The principal object of the invention is to provide a process having a series of well coordinated steps to be practiced in indelibly marking the insulation on leads extending from electrical apparatus to permit easy identification thereof.

As is well known in the art, the manufacturers of electrical equipment supply motors having marked terminals attached to leads which extend to the various windings in the machines. The copper terminals have a number stamped thereon which identifies the lead as to its connection in the motor thereby assuring proper connection to a source of voltage supply used in obtaining operation of the motor. During normal usage, however, as the motor is moved from one site to another with consequent making and breaking of electrical connections, the terminals are damaged to an extent where the numbers impressed thereon are marred and defaced thereby making lead identification impossible. Further, the terminals occasionally twist or break off completely when subjected to rough usage. It is apparent that the expense and inconvenience involved in determining what leads extend to the various windings upon loss of terminals and the man-hours of work lost by virtue of inoperativeness of the motor demand that the leads be provided with permanent markings capable of lasting the life of a machine.

In carrying out our invention, we provide apparatus for practicing a process in which a cable is fed from a reel through a heating device for imparting heat to insulation covering the conductor. When heated to a sufficient temperature, the cable is passed through a marking or indelible inking machine where a number is applied to the cable at spaced intervals prior to measuring and cutting the cable into leads of predetermined length. The marked leads are then stripped of insulation and a terminal having the same numeral as the markings is pressed thereon for forming a finished product. The aforementiontioned steps practiced in carrying out the process can be applied to any length and size of cable including any type of insulation used in protecting the conductor.

Figure 2:

Other objects and many of the attendant advantages of this invention will be readily appreciated as the same becomes better understood by reference to the following detailed description when considered in connection with the accompanying drawings wherein:

Figure 1 is a view in elevation of a series of spaced machines utilized in practicing the several steps of the invention; and Figure 2 is a plan view of a motor lead illustrating the arrangement of numerals on the insulation and terminal attached to the lead.

Referring now to the drawings wherein like reference characters designate like or corresponding parts throughout the several views, there is shown in Figure 1 the various items of machinery utilized in carrying out the invention. The illustrated apparatus consists of a cable 8 wound on a reel 10 arranged for feeding the cable into a cleaner 12 prior to delivery to a heater 14. As the cable leaves the heater 14, it is conducted to a cable marking machine 16 where an indelible numeral is applied to the outer surface, through a dereeling drive machine 18, and finally, to a cutting, stripping and crimping machine 20 arranged for attaching a marked terminal on an end of a lead cut and stripped by the machine.

Referring more specifically now to each of these items of machinery, the reel of wire 10 is of an ordinary type suitably mounted on a stand 22, or other support, and being arranged at such a height as to conveniently feed the cable into the cable cleaner 12. It is well known that when a cable remains in storage for a considerable period of time, a talc-like and/or wax-like deposit often forms on the cable insulation which must be removed to provide a clean surface for reception of the inked numerals. The apparatus for removing such talc or wax consists of a pair of brushes 24 vertically mounted on a stand 26 and arranged to be driven by any suitable power equipment so that when the cable passes between the rotating brushes, the fibers thereon thoroughly remove any foreign deposit on the cable insulation. In addition the brushes serve a second purpose of slightly roughening the surface of the insulation making it more receptive to the marking compound. In lieu of the brush arrangement, a spirally wound cloth saturated with a talc and wax solvent for example, can also be utilized effectively to remove undesirable substances on the cable.

The heater 14 is shown as being a radiant open oven type and generally comprises a semi-circular shield 28 having electrical resistance elements 30 spaced along the inner surface thereof and supplied with electrical power from any suitable source. A pair of pulleys 32 and 34 are mounted on the machine and arranged in a manner to receive the cable and cause it to make several passes through the heater prior to delivery to the marking machine. The cable is retained within the heater for a period of time sufficient to heat it to a temperature in the neighborhood of 125° C. The purpose of imparting heat to the insulation of the cable is to drive off solvents in an ink so as to prevent smearing of the ink on the cable when it is cut and crimped in the machine. In event cable 8 stops moving for any reason, a control circuit, not shown, responds in a manner to cause upward movement of the oven from the cable and thereby prevent damage to the cable insulation.

The inking machine 16 consists of a frame supporting an adjustably mounted wheel 36 placed adjacent a removable printing or inking wheel 38 having spaced identical numbers provided on its outer peripheral surface. An internal ink reservoir including an inking pad 40, rotatably mounted on the machine, is arranged for contact by wheel 38 so that as the cable is pulled between wheels 36 and 38, the exposed and raised numbers on wheel 38 will pick up ink and deposit it on the cable to form a series of indelible numerals of the same number spaced along the elngth of the cable. It is to be noted that the exposed numbers on wheel 38 are of concave characteristic for facilitating the marking of circular objects. Wheels having flat outer peripheral surfaces could likewise be employed in marking objects of rectilinear configuration. The ink utilized in practicing the process is of a type disclosed in application Serial No. 465,735, filed October 29, 1954, by A. F. Ringwood, entitled "Ink" and assigned to the same assignee as this invention. It will be evident that the spaced numbers on any wheel are the same and that a different number is allocated to each wheel so that any desired numeral can be continuously applied to the cable by merely selecting a wheel having that desired number. Adjustable drive rolls 42 are also provided for guiding the cable into the inking apparatus and for providing rotary movement to inking wheel 38, thereby precluding slippage between the inking wheel and cable as the latter is fed therethrough during the process of inking. In order to provide for the application of ink on insulated conductors of different diameters, the wheel 36 is mounted for vertical movement with respect to the inking wheel 38. Vertical adjustment of wheel 36 to accommodate different sizes of conductors is accomplished by a shaft equipped with a knurled knob 44 which serves to locate the wheel 36 in the desired position.

The dereeling machine 18 comprises a pair of rotatably mounted wheels 46 and 48 over which the cable passes and inserted therebetween is a pulley 50 provided with suitable weights 52 for creating a predetermined stress on the cable as it is fed through the heater and inking machines. When a proper tension is applied to the cable as it is fed through these machines, a speed of 60 feet per minute is not unusual and the numerals on the cable are substantially dry at the time of cutting.

The cable is then delivered to well known commercially available automatic apparatus 20 where it is measured and cut to predetermined lengths prior to stripping the insulation from both ends and applying a marked terminal to only one end thereof.

Figure 2 illustrates the type of lead produced by practicing the process of this invention. The insulation is provided with numerals as described above and the terminal likewise has an identical numeral for identification purposes. In one satisfactory embodiment, the lead was provided with numerals having a length of 3/16 inch and spaced at 3/4 inch intervals to provide a product easily recognized by the bold type characters printed thereon.

Obviously many modifications and variations of the present invention are possible in light of the above teachings. It is therefore to be understood that within the scope of the appended claims the invention may be practiced otherwise than as specifically described.

What we claim as new and desire to secure by Letters Patent of the United States is:

1. A process for marking and making electrical leads of predetermined length for use with electrical apparatus comprising the steps of passing an insulated conductor from which leads are formed in heat exchange relationship with a heat source for raising the temperature of the insulation to at least 125° C., selecting an ink capable of permanently adhering to the insulation and containing solvents which quickly vaporize when subjected to temperatures in the neighborhood of 125° C., moving said conductor through a legend marking device and printing a character on said conductor at spaced intervals with said ink, measuring and cutting said printed insulated conductor into predetermined lengths, and stripping the insulation from an end thereof and attaching a marked terminal to said end.

2. The process according to claim 1 including the additional step of removing foreign deposits from the insulation and roughening the surface of the insulation prior to applying the ink thereto.

3. A process for marking an insulated conductor with an indelible legend comprising the steps of moving said insulated conductor in heat exchange relationship with a heater for a predetermined period of time for imparting heat to the conductor insulation, feeding the heated conductor to a marking device, applying a permanent and indelible ink to the insulation to form legends at spaced intervals, utilizing the heat in said insulation to drive off solvents in said ink and thereby prevent smearing during later stages of the process, and measuring and cutting said conductor into lengths adapted to receive a terminal.

References Cited in the file of this patent
UNITED STATES PATENTS

| | | |
|---|---|---|
| 1,738,710 | Jones | Dec. 10, 1929 |
| 2,194,941 | Hinsky | Mar. 26, 1940 |
| 2,636,408 | Mitchell | Apr. 28, 1953 |
| 2,700,208 | Messimer | Jan. 25, 1955 |
| 2,735,165 | Soref | Feb. 21, 1956 |
| 2,802,412 | Lecluyse | Aug. 13, 1957 |